March 26, 1968 B. E. DENTON 3,375,436

REGULATED HIGH VOLTAGE D.C. POWER SUPPLY

Filed Nov. 17, 1964

INVENTOR.
BETHEL EDWARD DENTON

BY

W. H. Sprague
Attorney

United States Patent Office 3,375,436 Patented Mar. 26, 1968

3,375,436
REGULATED HIGH VOLTAGE D.C. POWER SUPPLY

Bethel E. Denton, Robards, Ky., assignor to Radio Corporation of America, a corporation of Delaware
Filed Nov. 17, 1964, Ser. No. 411,839
6 Claims. (Cl. 323—22)

This invention relates generally to voltage regulators, and particularly to improvements in voltage supply regulator circuits of the type used, for example, in conjunction with the high voltage supplies of color television receivers.

As known, it is not uncommon for home power line voltages to vary between plus and minus 15 percent from the normal voltage. In a color television receiver the usual color image reproducing device (e.g., the tri-gun, shadow mask color kinescope) requires a highly stabilized ultor or final accelerating voltage when the line voltage is at normal or higher than normal voltage. This, as known, is in order that the color selection functions of the reproducing device be performed properly. At lower than normal line voltages, however, it is preferable that the ultor voltage decrease with line voltage. This is because the power available for the image producing beam current of the reproducing device is dependent upon the line voltage. The beam current power is equal to the product of the ultor voltage times the beam current. If the ultor voltage is maintained constant when the line voltage is reduced below normal, the loss in beam current power results in a large decrease of beam current. This, it is found, is undesirable and less satisfactory than a situation wherein there is a smaller decrease in beam current accompanied by a decrease in ultor voltage.

The ultor voltage is conventionally derived by rectification of flyback pulses periodically developed across the windings of the horizontal output transformer of the television receiver. The amplitude of the ultor voltage, if not regulated, is dependent upon the line voltage as well as upon beam current changes occasioned by image content changes. One scheme for effecting high voltage regulation involves shunting of a regulator triode (i.e., its anode-cathode discharge current path) across the output terminals of the ultor supply and in parallel with the color kinescope load of the ultor supply. A voltage responsive to the variations in the line voltage is applied between the control grid and cathode of the regulator triode in such polarity as to cause a change in the impedance presented by the regulator tube to the ultor supply in a direction compensating for the variations in the line and ultor voltages. That is, the loading of the ultor voltage supply is either increased or decreased as necessary in order to regulate the ultor voltage.

In one prior art circuit the control grid of the regulator triode is connected to an intermediate point on a resistive voltage divider shunted across the B-boost voltage supply of the receiver. The resistive divider consists of a varistor or voltage dependent resistor (VDR) in series with a fixed resistor and a variable resistor. With the regulator grid connected to the junction of the VDR and the fixed resistor, the effect of the divider is to divide the B-boost voltage substantially in half, subject to small departures from such a division ratio in accordance with the setting of the variable resistor. The reason for this division of the B-boost voltage is to obtain a sample voltage falling in a range suitable for the desired current control of the regulator. The regulator cathode is maintained at the potential of the B+ supply of the receiver which is roughly one-half of the usual B-boost voltage.

The B-boost voltage and the B+ voltage are substantially linearly dependent upon the line voltage. Thus, upon increase in line voltage, the ultor voltage will tend to increase and the B-boost and B+ voltages will also tend to increase, the B-boost voltage increasing about twice as fast as the B+ voltage. When the B-boost voltage is increased the resistance presented by the VDR decreases whereby substantially all of the increase in the B-boost voltage appears across the fixed and variable resistors. The voltage of the control grid of the regulator tube thus rises more rapidly than the voltage of the cathode of the regulator tube which increases only by the smaller increase in the B+ voltage. The regulator tube thus presents a low impedance to the ultor voltage supply and draws a sizeable current, thereby regulating the ultor voltage and preventing it from increasing.

A disadvantage of the circuit described is that it also provides a constant amplitude ultor voltage with decreasing line voltages. With decreasing line voltages, the B-boost and B+ voltages decrease and the resistance presented by the VDR increases. Thus, the voltage drop in the B-boost voltage appears mostly across the fixed and variable resistors of the B-boost voltage divider and the voltage at the control grid of the regulator tube falls more rapidly than the voltage at the cathode of the regulator tube. The regulator tube thus presents a high impedance to the ultor voltage supply, drawing little or no current, and thereby compensating for the tendency of the ultor voltage to decrease with decreasing line voltage. This, however, is undesirable since it is preferable that the ultor voltage decrease with decreasing line voltage.

An object of this invention is to provide a novel and improved regulated voltage supply.

A further object of this invention is to provide a voltage supply capable of providing a substantially constant amplitude output voltage with normal and above normal line voltages and providing a decreasing output voltage with decreasing line voltages.

The present invention is directed to an inexpensive modification of the described circuit whereby the normal and above normal line voltage operation of the circuit is unaffected, but wherein the ultor voltage is caused to decrease with decreasing line voltage. Such results are obtained in accordance with an embodiment of the present invention through the use of a second voltage divider in parallel with the voltage divider (first) of the described circuit including the varistor (VDR); the second voltage divider comprising a fixed resistor in series with a potentiometer and a Zener diode operating in its constant voltage conductive state. The tap or movable contact of the potentiometer is coupled through a diode, in a direction from the diode plate to the diode cathode, to the control grid of the regulator triode. At normal and above normal line voltages, as described hereinafter, the diode is non-conducting, and the second voltage divider has no effect upon the operation of the regulator triode. Regulation of the ultor voltage at a substantially constant value is thus obtained. With decreasing line voltages, as described hereinafter, the diode conducts, thereby coupling and clamping the control grid of the regulator tube to a reference potential effectively controlled by the Zener diode. The reference potential decreases in amplitude with decreasing line voltages at a rate somewhat slower than the rate of decrease of the amplitude of the potential of the cathode of the regulator triode. The impedance of the regulator triode is thereby prevented from increasing as it would under the control of the first voltage divider acting by itself and the loading of the ultor supply is not reduced. Accordingly, the ultor voltage decreases with decreasing line voltage.

Further description of the invention appears in connection with a description of the drawings, wherein.

Figure 1:
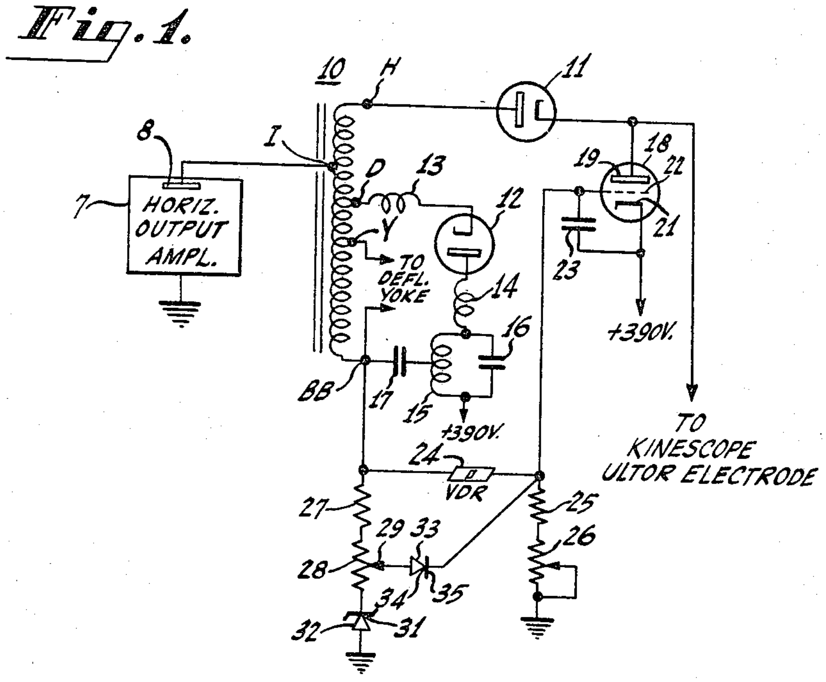
FIGURE 1 is a schematic diagram illustrating a horizontal deflection circuit of a television receiver incorporating an embodiment of this invention.

With reference to FIGURE 1, a horizontal output amplifier 7 is shown. The output amplifier 7 supplies a line scanning current to the horizontal windings of the deflection yoke of the receiver picture tube via a horizontal output transformer 10.

Output transformer 10 provides step-down autotransformer coupling between the output electrode 8 of amplifier 7 and the horizontal windings of the deflection yoke (not shown); the transformer 10 also provides step-up autotransformer action for delivering flyback pulses of augmented amplitude to the high voltage rectifier, diode 11. The primary winding of transformer 10 extends between an end terminal BB and an intermediate input terminal I (to which output electrode 8 is directly connected). The deflection yoke windings are coupled across a transformer secondary winding section defined by end terminal BB and an intermediate tap Y (between input terminal I and end terminal BB). An additional tap D is located on the primary winding section of transformer 10 between the input terminal I and the yoke connection tap Y; damper diode 12 has its cathode electrode coupled via choke 13 to the tap D. The anode of damper diode 12 is coupled via a choke 14 in series with an adjustable linearity or efficiency controlling inductor 15 to the B+ supply of the receiver. The inductor 15 is shunted by a capacitor 16, and a capacitor 17 is coupled between an intermediate tap on inductor 15 and the transformer end terminal BB. The damper diode serves conventional reaction scanning and power recovery purposes. Periodic conduction of the damper diode 12 develops a charge across the capacitor 17 which adds to the B+ supply potential to provide at terminal BB a so-called B-boost voltage, which thereupon constitutes a supply voltage of augmented amplitude.

The high potential end terminal H of the transformer 10 is directly connected to the anode of the high voltage rectifier diode 11. The cathode of diode 11 is directly connected to the ultor electrode of the receiver kinescope (not shown).

Regulation of the high voltage output of rectifier 11 is effected through the use of a regulator triode 18. The anode 19 of regulator triode 18 is directly connected to the cathode of diode 11, while the cathode 21 of regulator triode 18 is returned to the receiver's B+ supply. The control grid 22 of regulator triode 18 is bypassed to the cathode 21 for video signal frequencies by a capacitor 23.

A control voltage is supplied to the control grid 22 of triode 18 to vary the conductivity of triode 18 in accordance with variations in the line voltage and with changes in B-boost voltage resulting from changes in images in image content. As shown, the B+ and B-boost voltages vary linearly with the line voltage, and the ultor voltage also varies, although not necessarily linearly, with the line voltage. It is desired that the regulator triode should compensate for the tendency of the ultor voltage to increase with line voltages above normal line voltage by becoming more conductive and presenting a lower impedance to the ultor supply. Conversely, when the line voltage decreases below normal voltage, it is desired that the regulator triode conduction remain substantially constant.

A circuit for providing the desired control of regulator triode 18 comprises a first voltage dividing network including the series combination of a voltage dependent resistor (VDR) 24, a fixed resistor 25, and a variable resistor 26. The series combination of these resistors is connected between end terminal BB of the output transformer 10 and chassis ground. The junction between VDR 24 and fixed resistor 25 is directly connected to the control grid 22 of regulator triode 18.

The voltage divider network 24–25–26 divides down the B-boost voltage to provide a resultant voltage level at control grid 22 that is in a suitable operating point range with regard to the potential of the B+ connected to cathode 21. The voltage division ratio of the network 24–25–26 can be manually adjusted to a small degree through adjustment of the variable resistor 26 (which is relatively small in resistance value in comparison with the elements 24 and 25). However, for any selected adjustment of resistor 26, a fixed voltage division ratio is not established at the control grid 22, but, rather, a variable voltage division ratio is established, which varies with the level of the B-boost voltage at the terminal BB. This variation in division ratio is due to the characteristic of the VDR 24, which increases in resistance value as the B-boost voltage decreases, whereby the variations in the B-boost voltage suffer relatively little attenuation in the voltage division network.

Stated from another view, the characteristics of the VDR 24 are such as to maintain a relatively constant voltage drop across it as the B-boost voltage varies. With this tendency to maintain a relatively constant voltage across the VDR portion of the voltage divider network, it will be seen that substantially all of the variations in the voltage across the full network must appear across the ("voltage independent") remainder of the voltage divider network (i.e. between the regulator grid 22 and the chassis ground). Thus, the B-boost voltage variations are effectively repeated in a lower voltage range at the regulator grid, suffering relatively little attenuation in the voltage division network. One advantage of this arrangement is to increase the sensitivity of the control circuit to variations in the B-boost voltage.

The first voltage dividing network 24–25–26 provides regulation of the ultor voltage with normal and above normal line voltages, as described hereinafter. For obtaining the desired control of the ultor voltage at reduced line voltages, a second voltage dividing network is provided in parallel with the first dividing network. The second voltage dividing network comprises the series combination of a fixed resistor 27, a potentiometer 28 having a tap 29, and a Zener diode 31. The second dividing network 27–28–31 is connected between end terminal BB of the output transformer 50 and chassis ground. The anode 32 of the Zener diode 31 is connected to ground. The tap 29 of potentiometer 28 is connected to the anode 33 of a diode 34. The cathode 35 of the diode 34 is connected to the junction between VDR 24 and fixed resistor 25 and to the control grid 22 of regulator triode 18.

The second voltage divider network 27–28–31 divides down the B-boost voltage to provide, at normal line voltage, a voltage at tap 29 which is substantially equal in amplitude to the voltage which appears at the junction between VDR 24 and fixed resistor 25. Resistor 27 has a resistance value substantially higher than the resistance value of potentiometer 28. Zener diode 31 is operated in its constant voltage conductive state and has a fixed voltage drop thereacross. Because of the fixed voltage drop across Zener diode 31 and the small resistance value of the portion of potentiometer 28 between tap 29 and the lower terminal of potentiometer 28, the voltage change at tap 29 is small when compared with the change in B-boost voltage due to voltage source variations.

In the operation of the regulator tube 18 control circuit, tap 29 of potentiometer 28 is adjusted so that, at normal line voltage, diode 34 is just conducting or is at its conducting threshold.

With increasing line voltage, the B-boost and B+ voltages increase with the B-boost voltage increasing at a rate about twice as fast as that of the B+ voltage. As described, most of the voltage increase of the B-boost voltage appears across the fixed resistor 25 and the variable resistor 26 of the first voltage dividing network 24–25–26. Across the second voltage dividing network 27–28–31, however, most of the increase in B-boost voltage appears across fixed resistor 27, whereby the voltage at the anode 33 of diode 34 increases less rapidly than the voltage at the cathode 35 of the diode 34. Diode 34 is thus cut off and, at normal and above normal line voltage, the second voltage dividing circuit has no effect upon the operation of the voltage regulator tube 18.

As mentioned, most of the increase in the B-boost voltage appears across fixed resistor 25 and variable resistor 26 of the first voltage dividing network. This voltage increase appears at the control grid 22 of the regulator tube 18. The cathode 21 of regulator tube is connected directly to the B+ voltage which also rises upon increase in line voltage. Since the B-boost voltage rises faster than the B+ voltage, the bias on the regulator tube changes so as to increase the conductivity of the regulator tube, thus providing a greater load on the ultor voltage supply. Increasing the loading of the ultor supply compensates for the tendency of the ultor voltage to increase with increased line voltage. Accordingly, regulation of the ultor voltage with above-normal line voltages is obtained.

With decreasing line voltage, most of the decrease in the B-boost voltage appears across fixed resistors 25 and variable resistor 26 of the first voltage dividing network. In the second voltage dividing network most of the decrease in the B-boost voltage appears across fixed resistor 27, and variable resistor 28. Thus, the voltage at the cathode 33 of the diode 34 drops more rapidly than the voltage at the anode 35 of diode 34. Diode 34 thus conducts and provides a low impedance path between the control grid 22 of regulator tube 18 and tap 29, thereby clamping the control grid 22 to the reference potential at tap 29. As mentioned, because of the fixed voltage across the Zener diode 31 and the small value of resistance of the lower portion of potentiometer 28, the reference potential changes only a little with changes in the B-boost voltage. The voltage at control grid 22 of regulator tube 18 thus changes relatively slowly upon decrease in the B-boost voltage and changes at a rate slower than the rate of decrease of the B+ voltage. The bias on the regulator tube 18 thereby decreases and causes downward regulation of the ultor voltage.

By way of example, the following table of pertinent parameter values for the illustrated circuit is presented, the set of values having proved satisfactory in providing high voltage regulation of the noted order in a receiver; it will be appreciated that the present invention is in no way limited to such specific parameter values:

| | |
|---|---|
| VDR **24** | 300 kilohms at 300 volts, 24 megohms at 240 volts. |
| Fixed resistor **25** | 820 kilohms. |
| Variable resistor **26** | 0.5 megohm. |
| Resistor **27** | 560 kilohms. |
| Potentiometer **28** | 200 kilohms. |
| Zener diode **32** | 300 volt breakdown. |
| Diode **34** | Any 200 (or more) volt solid state diode. |

Figure 2:
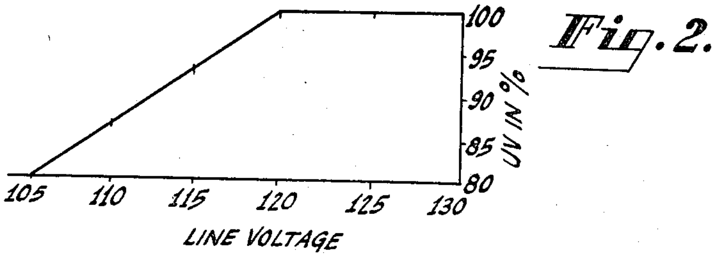
FIGURE 2 is a graph illustrating the variation of ultor voltage with line voltage obtainable with one embodiment of the present invention.
Figure 3:
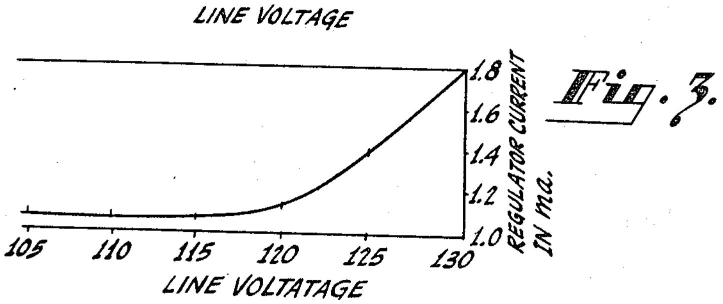
FIGURE 3 is a graph illustrating the variation of regulator tube cathode current with line voltage corresponding to the regulation of ultor voltage shown in FIGURE 2.

For the above parameter values the variation of ultor voltage with line voltage is shown in FIGURE 2; wherein the ordinate of the graph is percentage of ultor voltage (UV) and the abscissa of the graph is line voltage (LV), the normal line voltage being 120 volts. FIGURE 3 showing the variation in the regulator tube 18 current with line voltage; the ordinate of the graph being in milliamps (ma.) and the abscissa of the graph being line voltage (LV).

For reasons of greater sensitivity of response to variations in line voltage, as mentioned, it is found preferable to use VDR 24 in the first voltage divider network

24–25–26. It will be understood, however, that a "voltage independent" resistor (i.e. one whose value does not change appreciably with the applied voltage) may be used in place of the VDR 24. In such instance, the amplitude of the voltage variations across resistance elements 25 and 26 with changes in amplitude of the B-boost voltage will be smaller due to the voltage variations which occur across the "voltage independent" substitute for VDR 24. Nevertheless, as long as the voltage variations across elements 25 and 26 occur at a more rapid rate than the voltage variations between tap 29 and chassis ground of the second voltage divider network 27–28–31, the desired regulation with changes of line voltage may be obtained.

What is claimed is:

1. In a color television receiver energized by a power source and including a color image reproducing device having an ultor electrode, a high voltage rectifier having an output electrode connected to said ultor electrode for supplying an energizing potential thereto, a source of a first control voltage and a source of a second control voltage, said first and second control voltages being responsive to and reflective of variations in the voltage amplitude of said power source, one of said control voltages having a larger amplitude and exhibiting greater amplitude variations with variations in the voltage amplitude of said power source than the other of said control voltages, and a regulator device having a pair of control electrodes for altering the conductivity of a current path in said device, said current path being connected between said rectifier output electrode and said source of first control voltage, one of said control electrodes being coupled to said source of first control voltage, the combination comprising:
   - a first voltage divider network having a resistance-exhibiting portion connected between said second control voltage source and a point of substantially unvarying potential;
   - means for connecting the other control electrode of said regulator device to a point on the resistance-exhibiting portion of said first voltage divider network;
   - a second voltage divider network comprising a resistance-exhibiting portion and a substantially constant voltage portion connected in series in the order named between said source of second control voltage and said point of substantially unvarying potential; and
   - a diode connected from a point on said second voltage dividing network to said other control electrode of said regulator device in such a manner and polarity that said diode is maintained substantially non-conducting for a preselected voltage amplitude of said power source and is rendered conducting for voltage amplitudes of said power source lower than said preselected voltage amplitude.

2. In a color television receiver energized by a power source and including a color image reproducing device having an ultor electrode, a high voltage rectifier having an output electrode connected to said ultor electrode for supplying an energizing potential thereto, a source of a first control voltage and a source of a second control voltage, said first and second control voltages being responsive to and reflective of variations in the voltage amplitude of said power source, said second control voltage having a larger amplitude and exhibiting greater amplitude variations with variations in the voltage amplitude of said power source than said first control voltage, and a regulator device having a pair of control electrodes for altering the conductivity of a current path in said device, said current path being connected between said rectifier output electrode and said source of first control voltage, one of said control electrodes being coupled to said source of first control voltage, the combination comprising:
   - a first voltage divider network having a resistance-exhibiting portion connected between said second control voltage source and a point of substantially unvarying potential;

means for connecting the other control electrode of said regulator device to a point on the resistance-exhibiting portion of said first voltage divider network;

a second voltage divider network comprising a resistance-exhibiting portion and a substantially constant voltage portion connected in series in the order named between said source of second control voltage and said point of substantially unvarying potential; and a diode connected from a point adjacent to the junction of said resistance-exhibiting portion and said substantially constant voltage portion of said second voltage dividing network to said other control electrode of said regulator device, the cathode of said diode being connected to said other control electrode;

the voltage appearing across said substantially constant voltage portion of said second voltage divider network, when the voltage of said power source is at a preselected amplitude, being substantially equal to the voltage appearing across the resistance-exhibiting portion of said first voltage divider network between said other electrode of said regulator device and said point of substantially unvarying potential.

3. In a color television receiver energized by a power source and including color image reproducing device having an ultor electrode, a high voltage rectifier having an output electrode connected to said ultor electrode for supplying an energizing potential thereto, a source of a first control voltage and a source of a second control voltage, said first and second control voltages being responsive to and reflective of variations in the voltage amplitude of said power source, said second control voltage having a larger amplitude and exhibiting greater amplitude variations with variations in the voltage amplitude of said power source than said first control voltage, and a regulator device having a pair of control electrodes for altering the conductivity of a current path in said device, said current path being connected between said rectifier output electrode and said source of first control voltage, one of said control electrodes being connected to said source of first control voltage, the combination comprising:

a first voltage divider network comprising a pair of resistance-exhibiting portions connected in series between said second control voltage source and a point of substantially unvarying potential;

means for connecting the other control electrode of said regulator device to the junction between said resistance-exhibiting portions of said first voltage divider network;

a second voltage divider network comprising a resistance-exhibiting portion including a potentiometer having a tap, and a Zener diode connected in series in the order named between said second control voltage and said point of substantially unvarying potential, said Zener diode being in its constant voltage conductive state; and a diode connected between said potentiometer tap and said other control electrode of said regulator device, the cathode of said diode being connected to said other control electrode.

4. In a color television receiver energized by a power source and including a color image reproducing device having an ultor electrode, a high voltage rectifier having an output electrode connected to said ultor electrode for supplying an energizing potential thereto, a source of a first control voltage and a source of a second control voltage, said first and second control voltages being responsive to and reflective of variations in the voltage amplitude of said power source, said second control voltage having a larger amplitude and exhibiting greater amplitude variations with variations in the voltage amplitude of said power source than said first control voltage, and a regulator device having a pair of control electrodes for altering the conductivity of a current path in said device, said current path being connected between said rectifier output electrode and said source of first control voltage, one of said control electrodes being connected to said source of first control voltage, the combination comprising:

a first voltage divider network comprising a pair of resistance-exhibiting portions connected in series between said second control voltage source and a point of substantially unvarying potential;

means for connecting the other control electrode of said regulator device to the junction between said resistance-exhibiting portions of said first voltage divider network;

a second voltage divider network comprising a resistance-exhibiting portion including a potentiometer having a tap, and a Zener diode connected in series in the order named between said second control voltage and said point of substantially unvarying potential, said Zener diode being in its constant voltage conductive state; and a diode connected between said potentiometer tap and said other control electrode of said regulator device, the cathode of said diode being connected to said other control electrode, and the voltage appearing between said potentiometer tap and said point of substantially unvarying potential, when the voltage of said power source is at a preselected amplitude, being substantially equal to the voltage appearing across the resistance-exhibiting portion of said first voltage divider network between said other electrode of said regulator device and said point of substantially unvarying potential.

5. In a color television receiver energized by a power source and including a color kinescope having an ultor electrode, a high voltage rectifier having an output electrode connected to said ultor electrode for supplying an energizing potential thereto, a source of B+ potential responsive to variations in the amplitude of the voltage of said power source, a source of B-boost voltage responsive to variations in the amplitude of the voltage of said power source, and a regulator triode having cathode, control grid and anode electrodes, the anode-cathode current path of said triode being connected between said rectifier output electrode and said source of B+ potential, the combination comprising:

a first voltage divider network comprising a first resistance-exhibiting portion and a second resistance-exhibiting portion connected in series in the order named between said B-boost voltage source and a point of substantially unvarying potential, said first resistance-exhibiting portion comprising a voltage dependent resistor varying in exhibited resistance inversely with respect to variations of said B-boost voltage amplitude, and said second resistance-exhibiting portion comprising the series combination of a pair of voltage independent resistors, one of said pair of voltage independent resistors being subject to manual adjustment of its resistance value;

means for connecting the control grid of said regulator triode to the junction of said first and second resistance-exhibiting portions of said first voltage divider network;

a second voltage divider network comprising a third resistance-exhibiting portion and a substantially constant voltage portion connected in series in the order named between said B-boost voltage and said point of substantially unvarying potential; and a diode connected between the junction of said third resistance-exhibiting portion and said substantially constant voltage portion of said second voltage divider network and the control grid of said regulator tube, the cathode of said diode being connected to said control grid, the voltage appearing across said substantially constant voltage portion of said second voltage divider network, when the voltage of said power source is at a preselected value, being substantially equal to the voltage appearing across said second resistance-exhibiting portion of said first voltage divider network.

6. In a color television receiver energized by a power source and including a color kinescope having an ultor electrode, a high voltage rectifier having an output electrode connected to said ultor electrode for supplying an energizing potential thereto, a source of B+ potential responsive to variations in the amplitude of the voltage of said power source, a source of B-boost voltage responsive to variations in the amplitude of the voltage of said power source, and a regulator triode having cathode, control grid and anode electrodes, the anode-cathode current path of said triode being connected between said rectifier output electrode and said source of B+ potential, the combination comprising:

a first voltage divider network comprising a first resistance-exhibiting portion and a second resistance-exhibiting portion connected in series in the order named between said B-boost voltage source and a point of substantially unvarying potential, said first resistance-exhibiting portion comprising a voltage dependent resistor varying in exhibited resistance inversely with respect to variations of said B-boost voltage amplitude, and said second resistance-exhibiting portion comprising the series combination of a pair of voltage independent resistors being subject to manual adjustment of its resistance value;

means for connecting the control grid of said regulator triode to the junction of said first and second resistance-exhibiting portions of said first voltage divider network;

a second voltage divider network comprising a resistance-exhibiting portion including a potentiometer having a tap, and a Zener diode connected in series in the order named between said B-boost voltage and said point of substantially unvarying potential, said Zener diode being in its constant voltage conductive state; and a diode connected between said tap of said potentiometer and the control grid of said regulator tube, the cathode of said diode being connected to said control grid, the voltage appearing between said potentiometer tap and said point of substantially unvarying potential, when the voltage of said power source is at a preselected voltage, being substantially equal to the voltage appearing across said second resistance-exhibiting portion of said first voltage divider network.

References Cited

UNITED STATES PATENTS

| | | | |
|---|---|---|---|
| 2,755,428 | 7/1956 | Baum | 321—18 |
| 2,782,340 | 2/1957 | Siskel | 315—30 |
| 3,350,599 | 10/1967 | Rickling | 315—22 |

JOHN F. COUCH, *Primary Examiner.*

WARREN E. RAY, *Examiner.*